US006918723B2

(12) United States Patent
Bättig et al.

(10) Patent No.: US 6,918,723 B2
(45) Date of Patent: Jul. 19, 2005

(54) SHAFT/HUB CONNECTION

(75) Inventors: Josef Bättig, Egliswil (CH); Alfred Müller, Lenzburg (CH); Balz Flury, Wurenlos (CH)

(73) Assignee: ABB Turbo Systems AG, Baden (CH)

( * ) Notice: Subject to any disclaimer, the term of this patent is extended or adjusted under 35 U.S.C. 154(b) by 0 days.

(21) Appl. No.: 10/861,360

(22) Filed: Jun. 7, 2004

(65) Prior Publication Data

US 2004/0258467 A1 Dec. 23, 2004

(30) Foreign Application Priority Data

Jun. 19, 2003 (EP) ............................................ 03405441

(51) Int. Cl.[7] ................................................ F16B 13/04

(52) U.S. Cl. ........................... 411/17; 411/18; 411/378; 403/299

(58) Field of Search ............................ 411/17, 18, 378, 411/366.3; 403/299

(56) References Cited

U.S. PATENT DOCUMENTS 4,085,652 A * 4/1978 Vanotti ........................ 411/17
4,304,428 A 12/1981 Grigorian et al.
4,309,135 A * 1/1982 Gutshall ...................... 411/17
4,712,955 A * 12/1987 Reece et al. .................. 411/17

FOREIGN PATENT DOCUMENTS

| | | |
|---|---|---|
| DE | 39 13 974 A1 | 12/1989 |
| DE | 44 44 082 A1 | 6/1996 |
| GB | 241211 | 1/1927 |
| GB | 826136 | 12/1959 |

* cited by examiner

*Primary Examiner*—John R. Cottingham
(74) *Attorney, Agent, or Firm*—Burns, Doane, Swecker & Mathis LLP

(57) ABSTRACT

The shaft is connected to the shaft attachment by a thread. A bore with an internal thread is incorporated in the shaft attachment and the shaft has a corresponding stem which can be introduced into the threaded bore and has an external thread. An axial stop is arranged on the shaft and on the shaft attachment. The internal and external threads have torque-transmitting flanks which are flat toward the axis and which can be connected to one another frictionally by radial pressure by mutual rotation of shaft and shaft attachment with interaction between the axial stops. Owing to the small angle between the load-bearing flanks and the axis, the radial pressure decisive for the torque transmission is correspondingly greater than in conventional threaded connections. As a result, the axial prestressing force between the two parts to be connected can be correspondingly reduced.

11 Claims, 4 Drawing Sheets

SHAFT/HUB CONNECTION

TECHNICAL FIELD

The invention relates to the field of shaft/hub connections.

It relates to the connection of a shaft to a shaft attachment by means of a thread according to the preamble of patent claim 1. It also relates to a turbocharger, the turbine shaft of which is correspondingly connected to the compressor wheel.

PRIOR ART

Turbochargers for increasing the output of reciprocating piston engines comprise a turbine driven by engine exhaust gases and a compressor connected to the turbine via a torque-transmitting shaft. Turbochargers for lower engine outputs advantageously have a radial compressor of aluminum without a continuous central bore, as disclosed, for instance, by DE 44 44 082.

In this case, for production and maintenance reasons, the compressor wheel is releasably connected to the turbine shaft.

In the known solutions, the compressor wheel is screwed onto a shaft stub with a conventional thread either directly or via an intermediate bush of steel or bronze. At least one cylindrical or conical centering seat offset relative to the thread provides for the centering of the compressor wheel relative to the shaft.

In such a shaft/compressor-wheel connection, the compressor wheel is restrained against an axial stop on the shaft. The torque transmission is effected frictionally in the thread via the load-bearing thread flanks pressed against one another in the axial direction. In conventional threads, the load-bearing thread flanks are at as steep an angle to the shaft axis as possible, so that the prestressing force can act essentially normal to the surface of the load-bearing thread flanks.

The most recent increases in output of the compressors of turbochargers necessitate an improved torque transmission from shaft to compressor wheel. In conventional connections, this means that the prestressing force has to be increased in order to press the load-bearing flanks of the threads against one another to a greater extent in the axial direction. However, this leads to reduced damping of the joint location between the parts connected to one another. In addition, a further restriction is the notch effect caused in conventional threads by the jump in cross section from thread turn to thread turn.

BRIEF SUMMARY OF THE INVENTION

Consequently, the object of the invention is to provide a connection of the type mentioned at the beginning which permits an improved torque transmission with reduced axial prestress.

According to the invention, this object is achieved by the features of patent claim 1.

In the connection according to the invention of a shaft to a shaft attachment by means of a thread, in which a bore with an internal thread is incorporated either in the shaft attachment or in the shaft end, and the shaft or the shaft attachment has a corresponding stem which can be introduced into the threaded bore and has an external thread, and an axial stop is arranged in each case on the shaft and on the shaft attachment, the internal and external threads have torque-transmitting flanks which are flat toward the axis of shaft and shaft attachment and which can be connected to one another frictionally by means of radial pressure by mutual rotation of shaft and shaft attachment with interaction between the axial stops.

Owing to the small angle between the load-bearing flanks, bearing frictionally on one another with their large surfaces, and the axis, the radial pressure decisive for the torque transmission is correspondingly greater than in conventional threaded connections. As a result, the axial prestressing force between the two parts to be connected can be correspondingly reduced.

In addition, the load-bearing flanks of flat design permit improved centering of shaft attachment and shaft.

Further advantages follow from the dependent claims.

BRIEF DESCRIPTION OF THE DRAWINGS

An exemplary embodiment of the connection according to the invention is shown schematically and explained in more detail below with reference to the figures. In all the figures, elements having the same effect are provided with the same designations. In the drawing.

WAY OF IMPLEMENTING THE INVENTION

Figure 1:
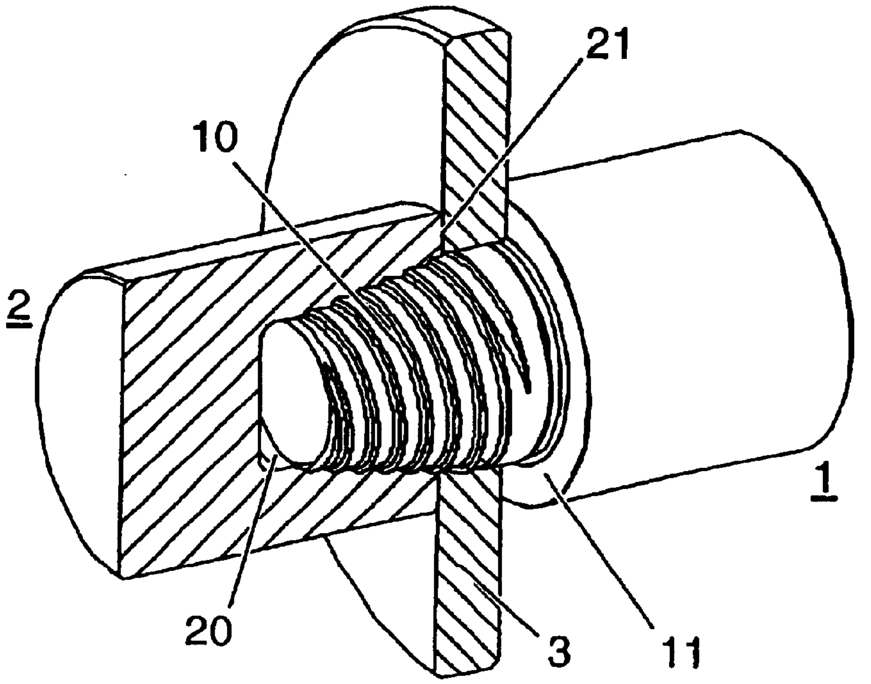
FIG. 1 shows a view of a shaft with a shaft attachment having a connection according to the invention.

FIG. 1 shows a shaft 1 and a shaft attachment 2 connected according to the invention to the shaft. By way of example, the shaft attachment is depicted as a cylindrical counterpart corresponding approximately to the shaft in shape and size. As a rule, the shaft attachment is a wheel-shaped part, such as, for instance, the compressor wheel of a turbocharger.

The shaft has an external thread in the region of the connecting point. In the embodiment shown, the external thread is formed on the shaft end in the form of a threaded stem 10. A corresponding bore 20 which is provided with an internal thread is incorporated in the shaft attachment.

For the axial positioning of the shaft attachment relative to the shaft, the shaft and shaft attachment have an axial stop 11 and 21. As a rule, the two axial stops have surfaces which are produced with high precision and are parallel to one another, whereby they contribute substantially to the concentric running of shaft attachment and shaft. Further parts, for example a sealing or damping disk 3 as shown in the figure, may be arranged between the axial stops.

Figure 2:
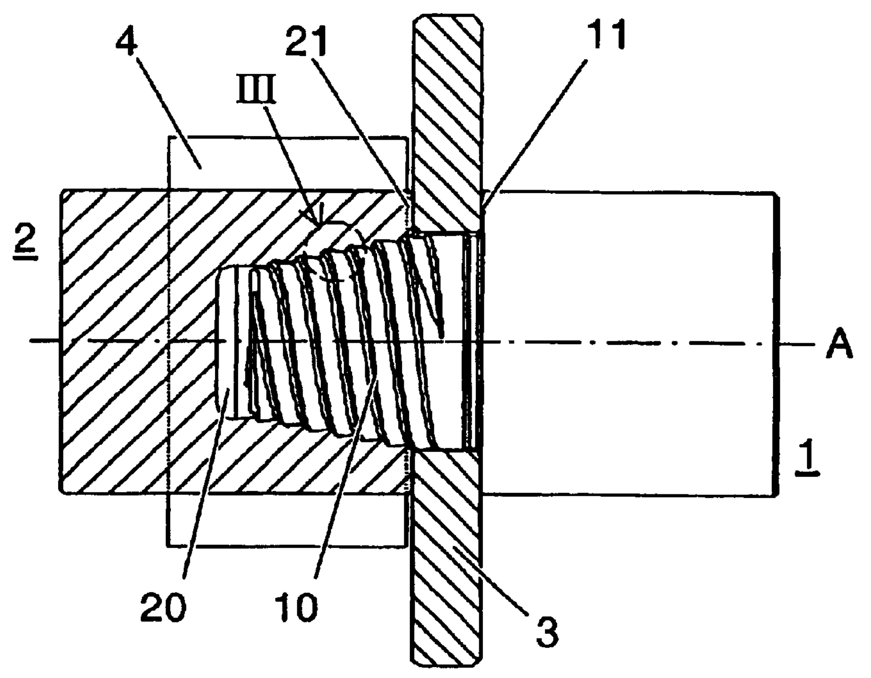
FIG. 2 shows a section along the shaft axis through the connection according to FIG. 1.

FIG. 2 shows a section along the shaft axis through the connection according to the invention. When the shaft attachment is screwed onto the shaft, the two axial stops 11 and 21 are pressed together, as a result of which the shaft attachment is prestressed against the shaft.

Since the shaft attachment, as a rule, is a larger part produced from a relatively soft material, the expansion of the shaft attachment by the threaded stem can be prevented in the region of the threaded connection by a hard steel sleeve 4 being pushed onto the shaft attachment.

Figure 3:
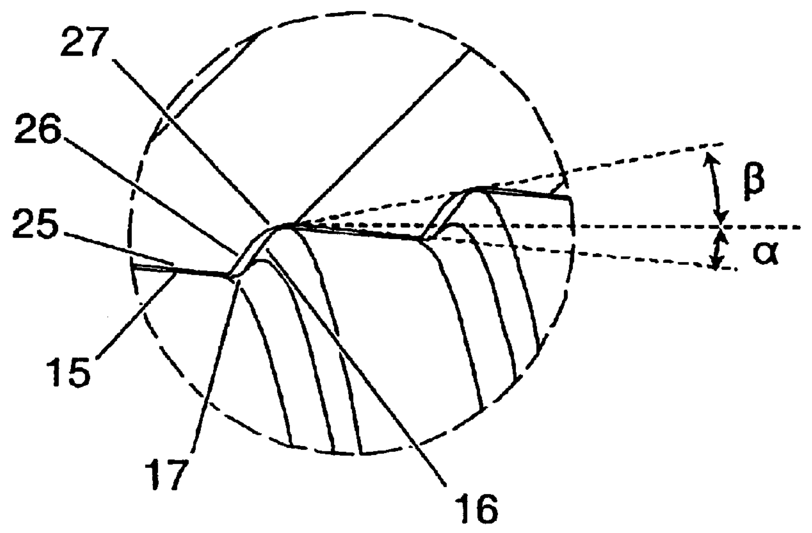
FIG. 3 shows an enlarged detail III—III of the connection according to FIG. 2.
Figure 4:
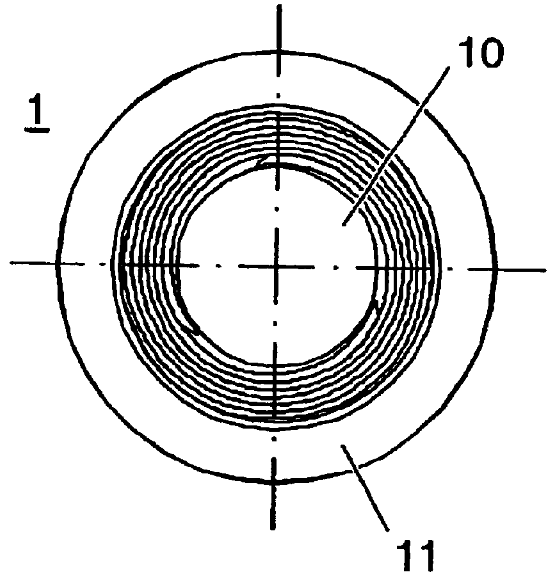
FIG. 4 shows a view of the shaft according to FIG. 1 in the axial direction.
Figure 5:
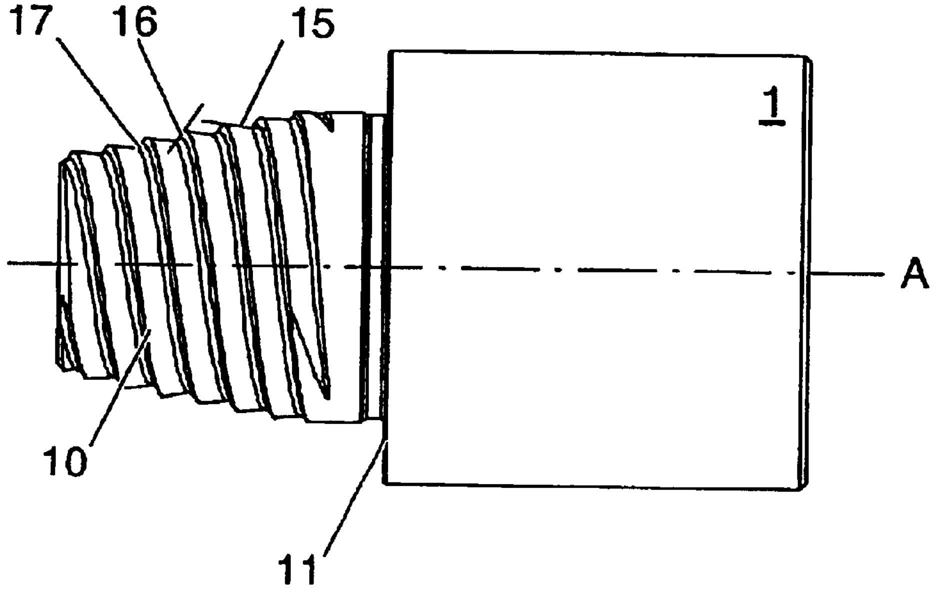
FIG. 5 shows a view of the shaft according to FIG. 1 perpendicularly to the axis.
Figure 6:
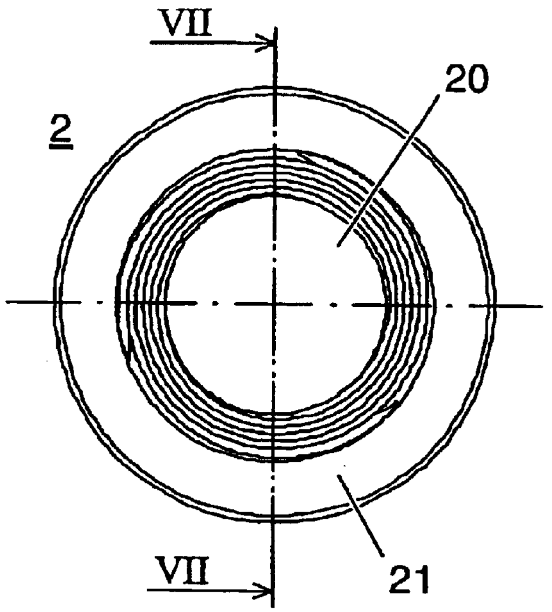
FIG. 6 shows a view of the shaft attachment according to FIG. 1 in the axial direction.
Figure 7:
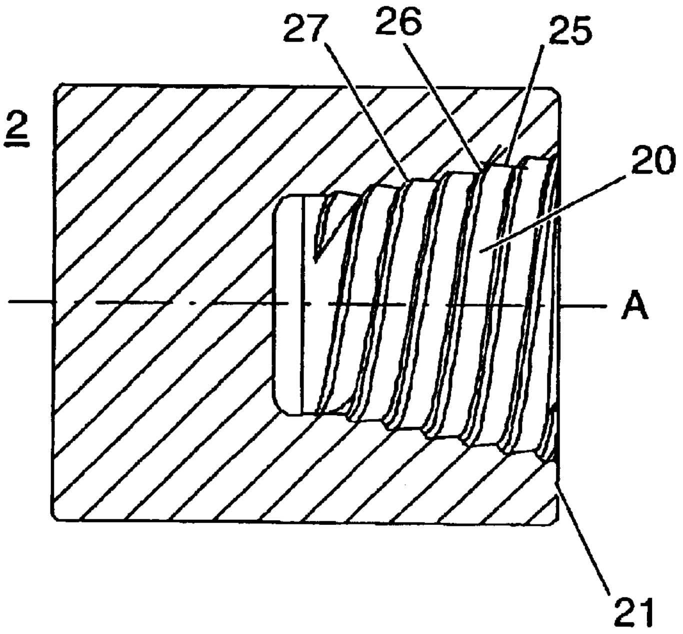
FIG. 7 shows a section along VII—VII through the shaft attachment according to FIG. 6.

The special design of the thread according to the invention is shown enlarged in FIG. 3. The thread has load-bearing flanks 15 and 25 and production-related non-loaded flanks 16 and 26. The load-bearing flanks 15 and 25 enclose a very small angle $\alpha$ with the axis A of the shaft and the shaft attachment. The flank angle α is ideally 5° to 15°, but, depending on the demands made on the connection or the material of the parts to be connected, may also be within the range of 0° to 45° or even 60°. The smaller this angle α, the lower is the axial prestressing force which can be transmitted by the thread in order to brace the two parts to be connected, the shaft and the shaft attachment, against one another by means of the axial stops.

On the other hand, the radial pressure, decisive for the torque transmission, in the case of a small angle between the load-bearing flanks and the axis is correspondingly larger. The load-bearing flanks bear frictionally on one another with their large surfaces.

For further reduction of the prestressing force, the thread according to the invention is of multiple-start, preferably 3-start, design. At a given flank angle, this results in thread grooves which are less deep and thus in less cross-sectional weakening. In addition, a 3-start thread, on account of the triple cyclic symmetry, leads to improved centering of the shaft attachment on the shaft.

Furthermore, the screw-on angle is greatly reduced by the larger helix angle of the turns of the multiple-start thread.

The load-bearing flanks of flat design bring about a further improvement in the centering of the shaft attachment on the shaft.

Compared with conventional threads, the flat thread according to the invention has substantially larger fillet radii 17 and 27. As a result, the thread according to the invention has virtually no notch effect and can be loaded to a substantially greater extent with regard to dynamic torque fluctuations than a conventional thread.

If the thread is a conical thread, as shown in the various figures, the introduction of force is improved compared with a cylindrical design, whereas the screw-on distances become shorter. The steeper the angle β of the cone, the shorter are the screw-on distances, since several thread turns can occasionally be skipped during the screwing-on.

FIGS. 4 to 7 show detailed individual views of the shaft and the shaft attachment. The views in the axial direction show the three-start threads. The three thread turns are each arranged offset by 120°.

The arrangement of the threaded stem and of the bore, or of the external and internal threads, may also be transposed, so that a threaded stem is arranged on the shaft attachment and the corresponding bore is incorporated in the shaft end.

Furthermore, the threaded stem need not be designed as a stub. Thus, for instance, the external thread may be arranged in a center region of a bar-shaped shaft, the bore in the shaft attachment having to be correspondingly deep or continuous for the threaded extension.

LIST OF DESIGNATIONS

A Axis
α Flank angle
β Cone angle of the thread
1 Shaft, turbine shaft
10 Threaded stem
11 Shaft shoulder
15 Load-bearing flank (external thread)
16 Non-load-bearing flank (external thread)
17 Fillet (external thread)
2 Shaft attachment, compressor wheel
20 Threaded bore
21 Flat stop
25 Load-bearing flank (internal thread)
26 Non-load-bearing flank (internal thread)
27 Fillet (internal thread)
3 Intermediate body, seal
4 Steel sleeve

What is claimed is:

1. A connection of a shaft to a shaft attachment by means of a thread comprising, a bore with an internal thread being incorporated either in the shaft attachment or in the shaft end, and the shaft or the shaft attachment having a corresponding stem which can be introduced into the threaded bore and having an external thread, and an axial stop being arranged in each case on the shaft and on the shaft attachment, wherein the internal and external threads have torque-transmitting flanks which are flat toward the axis of the shaft and the shaft attachment and which can be connected to one another frictionally by means of radial pressure by mutual rotation of the shaft and the shaft attachment with interaction between the axial stops; and wherein the threaded region of the threaded stem and the threaded region of the threaded bore are overall conical in shape.

2. The connection as claimed in claim 1, wherein the thread is a multiple-start thread.

3. The connection as claimed in claim 1, wherein the torque-transmitting flanks form an angle of less than 45° with the axis of shaft and shaft attachment.

4. A turbocharger, comprising a turbine wheel and a compressor wheel connected to the turbine wheel via a shaft, the shaft and the compressor wheel being connected by means of a thread, a bore with an internal thread being incorporated either in the compressor wheel or in the shaft end, and the shaft or the compressor wheel having a corresponding stem which can be introduced into the threaded bore and has an external thread, and an axial stop being arranged in each case on the shaft and on the compressor wheel, wherein the internal and external threads have torque-transmitting flanks which are flat toward the axis of shaft and shaft attachment and which can be connected to one another frictionally by means of radial pressure by mutual rotation of shaft and shaft attachment with interaction between the axial stops.

5. The turbocharger as claimed in claim 4, wherein a threaded region of the threaded stem and a threaded region of the threaded bore are designed to be overall conical in shape.

6. The turbocharger as claimed in claim 4, wherein the thread is a multiple-start thread.

7. The turbocharger as claimed in claim 4, wherein the torque-transmitting flanks form an angle of less than 45° with the axis of shaft and shaft attachment.

8. The connection as claimed in claim 1, wherein the thread is a three-start thread.

9. The connection as claimed in claim 1, wherein the torque-transmitting flanks form an angle between 5° and 15° with the axis of the shaft and the shaft attachment.

10. The turbocharger as claimed in claim 4, wherein the thread is a three-start thread.

11. The turbocharger as claimed in claim 4, wherein the torque-transmitting flanks are between 5° and 15° with the axis of shaft and shaft attachment.

* * * * *